United States Patent
Ouderkirk et al.

(10) Patent No.: US 9,599,766 B2
(45) Date of Patent: Mar. 21, 2017

(54) LAMINATED DISPLAY UNIT

(71) Applicant: 3M INNOVATIVE PROPERTIES COMPANY, St. Paul, MN (US)

(72) Inventors: Andrew J. Ouderkirk, St. Paul, MN (US); Michael F. Weber, Shoreview, MN (US); Robert R. Kieschke, Woodbury, MN (US); Timothy J. Nevitt, Red Wing, MN (US); Charles David Hoyle, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 104 days.

(21) Appl. No.: 14/254,678

(22) Filed: Apr. 16, 2014

(65) Prior Publication Data

US 2015/0301271 A1 Oct. 22, 2015

(51) Int. Cl.
G02F 1/1339 (2006.01)
G02F 1/1337 (2006.01)
F21V 8/00 (2006.01)

(52) U.S. Cl.
CPC ............ *G02B 6/0081* (2013.01); *G02B 6/005* (2013.01); *G02B 6/0028* (2013.01); *G02B 6/0036* (2013.01)

(58) Field of Classification Search
CPC ..... B29C 43/222; B29C 43/28; B29C 47/004; B29C 43/265; B29C 47/065;

(Continued)

(56) References Cited

U.S. PATENT DOCUMENTS 7,328,638 B2 2/2008 Gardiner
7,350,442 B2 4/2008 Ehnes
(Continued)

FOREIGN PATENT DOCUMENTS

WO WO 00-48037 8/2000
WO WO 2005-080862 9/2005
(Continued)

OTHER PUBLICATIONS

Funamoto, "LED backlight system with double prism pattern", Journal of the Society for Information Display, 2006, vol. 14, No. 11, pp. 1045-1051.
(Continued)

*Primary Examiner* — Huyen Ngo
(74) *Attorney, Agent, or Firm* — Clifton F. Richardson

(57) ABSTRACT

A laminated display unit having a light guide, an LCD panel laminated to a major surface of the light guide and a high modulus layer laminated to the light guide opposite the LCD panel. A first material having refractive index $n_1$ is disposed immediately adjacent a first major surface of the light guide and a second material having a refractive index $n_2$ is disposed immediately adjacent a second major surface of the light guide. The light guide has a refractive index $n_g$ which is greater than about 1.05 times $n_{max}$ where $n_{max}$ is the larger of $n_1$ and $n_2$. At least one of the first major surface and the second major surface includes a plurality of multiplets where each multiplet includes two or more extraction features.

20 Claims, 9 Drawing Sheets

(58) Field of Classification Search
CPC ............ B29C 47/003; B29D 11/00663; G02B 6/0065; G02B 6/0036; G02B 6/0056
See application file for complete search history.

(56) References Cited

U.S. PATENT DOCUMENTS

| | | | |
|---|---|---|---|
| 7,595,934 | B2 | 9/2009 | Lubart |
| 7,655,283 | B2 | 2/2010 | Sherman |
| 2002/0172031 | A1 | 11/2002 | Masuda |
| 2003/0156238 | A1* | 8/2003 | Hiraishi ............... G02B 5/0242 349/112 |
| 2007/0139576 | A1 | 6/2007 | Hunt |
| 2007/0279934 | A1 | 12/2007 | Kim |
| 2007/0297736 | A1 | 12/2007 | Sherman |
| 2011/0134623 | A1 | 6/2011 | Sherman |
| 2011/0170184 | A1 | 7/2011 | Wolk |
| 2012/0038990 | A1 | 2/2012 | Hao |
| 2012/0051705 | A1* | 3/2012 | Greener ................ B29C 43/222 385/131 |
| 2012/0230053 | A1 | 9/2012 | Griffiths |
| 2013/0201721 | A1 | 8/2013 | Tsai et al. |
| 2013/0258709 | A1 | 10/2013 | Thompson |
| 2014/0043856 | A1 | 2/2014 | Thompson |
| 2015/0070327 | A1* | 3/2015 | Hsieh .................... G06F 3/0421 345/175 |

FOREIGN PATENT DOCUMENTS

| | | |
|---|---|---|
| WO | WO 2013-122728 | 8/2013 |
| WO | WO 2014-011731 | 1/2014 |
| WO | WO 2014-089289 | 6/2014 |

OTHER PUBLICATIONS

Gegel, "Short-Fiber Cast Aluminum MMCs: Properties & Value", Solidification Processing of Metal Matrix Composites Rohatgi Honorary Symposium, 239-248 (2006).
Lasagni, "Interpenetrating Hybrid Reinforcement in $Al_2O_3$ Short Fiber Performs Infiltrated by Al-Si Alloys", Metallurgical and Materials Transactions A, Jun. 2008, vol. 39A, pp. 1466-1474.

* cited by examiner

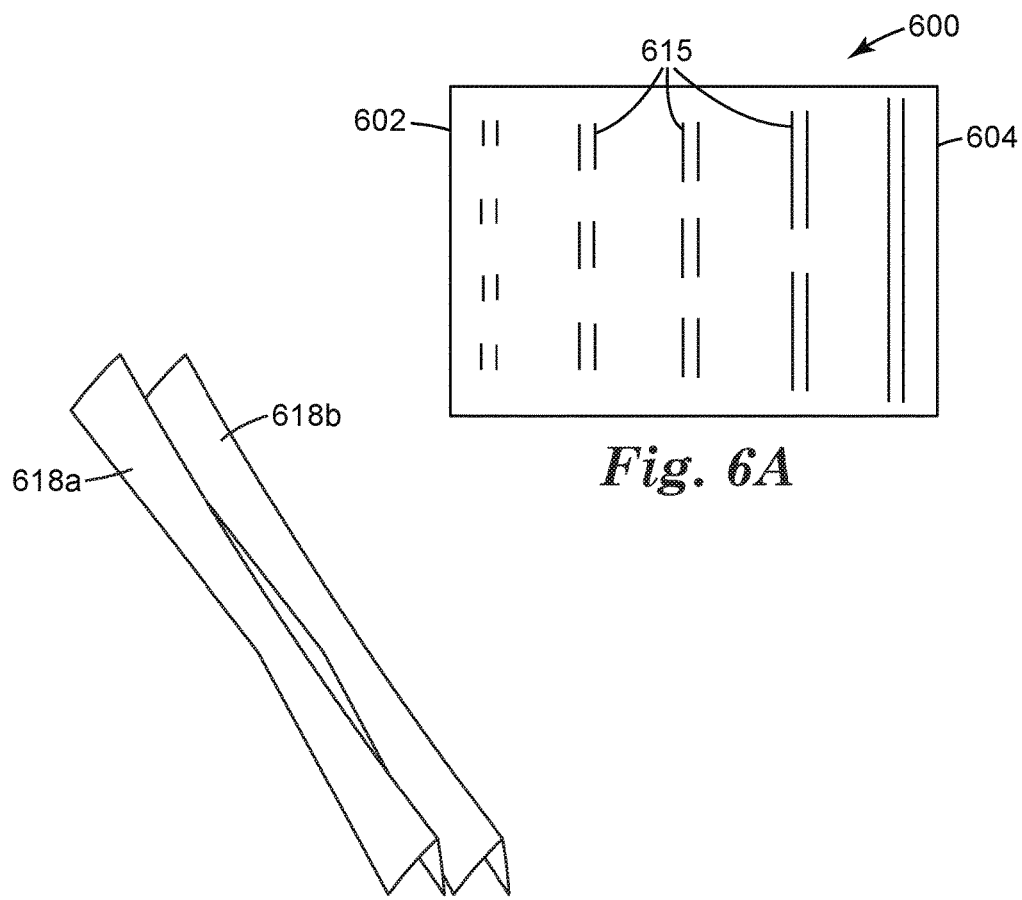
Fig. 6A
Fig. 6B
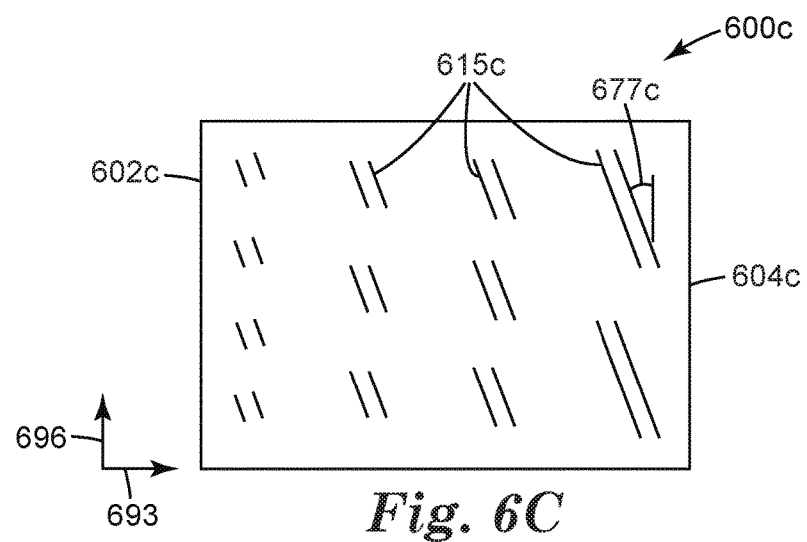
Fig. 6C

LAMINATED DISPLAY UNIT

BACKGROUND

In a conventional Liquid Crystal Display (LCD), a backlight generates a light output that is used to illuminate an LCD panel. An air gap is included between the backlight and any optical films that are between the backlight and the LCD panel in order for the desired degree of total internal reflection to occur at the output face of the backlight. A thick glass layer is typically included in the display in order to provide a needed degree of rigidity. This thick glass layer adds thickness and weight to the display. In many applications, a thinner and lighter display that does not sacrifice rigidity is desired.

SUMMARY

In some aspects, the present description provides a laminated display unit that includes a light guide having a first major surface, a second major surface opposite the first major surface, an input edge, and an opposing edge. The light guide has a refractive index $n_g$. A first material having a refractive index $n_1$ is disposed immediately adjacent to the first major surface of the light guide. A second material having a refractive index $n_2$ is disposed immediately adjacent to the second major surface of the light guide. The laminated display unit further includes an LCD panel laminated to the light guide adjacent to the first major surface and a first high modulus layer laminated to the light guide adjacent to the second major surface. $n_{max}$ is the larger of $n_1$ and $n_2$ and $n_g$ is greater than about 1.05 times $n_{max}$. At least one of the first major surface and the second major surface includes a plurality of multiplets where each multiplet includes two or more extraction features.

In some aspects, the present description provides a laminated display unit that includes a light guide having a first major surface, a second major surface opposite the first major surface, an input edge, and an opposing edge. The light guide has a refractive index $n_g$. A first material having a refractive index $n_1$ is disposed immediately adjacent to the first major surface of the light guide. A second material having a refractive index $n_2$ is disposed immediately adjacent the second major surface of the light guide. The laminated display unit further includes an LCD panel laminated to the light guide adjacent to the first major surface, a first high modulus layer laminated to the light guide adjacent the second major surface, and a light source disposed to inject light into the input edge of the light guide. $n_{max}$ is the larger of $n_1$ and $n_2$ and the light injected into the light guide is at least partially collimated such that at least 90% of the light injected into the light guide has an angle relative to a plane substantially parallel to a center plane of the light guide that is no more than about the inverse cosine of $n_{max}/n_g$.

In some aspects, the present description provides a laminated display unit that includes a light guide having a first major surface, a second major surface opposite the first major surface, an input edge, and an opposing edge. The light guide has a refractive index $n_g$. A first material having a refractive index $n_1$ is disposed immediately adjacent to the first major surface of the light guide. A second material having a refractive index $n_2$ is disposed immediately adjacent to the second major surface of the light guide. The laminated display unit further includes an LCD panel laminated to the light guide adjacent to the first major surface and a high modulus layer laminated to the LCD panel opposite the light guide. The light guide includes a transparent high modulus material. $n_{max}$ is the larger of $n_1$ and $n_2$ and $n_g$ is greater than about 1.05 times $n_{max}$. At least one of the first major surface and the second major surface includes a plurality of multiplets where each multiplet includes two or more extraction features.

BRIEF DESCRIPTION OF THE DRAWINGS

FIG. 6A is a schematic top view of a light guide having a multiplet extraction features;

FIG. 6B is a perspective view of a portion of a multiplet of FIG. 6A;

FIG. 6C is a schematic top view of a light guide having a multiplet extraction features;

DETAILED DESCRIPTION

Figure 1:
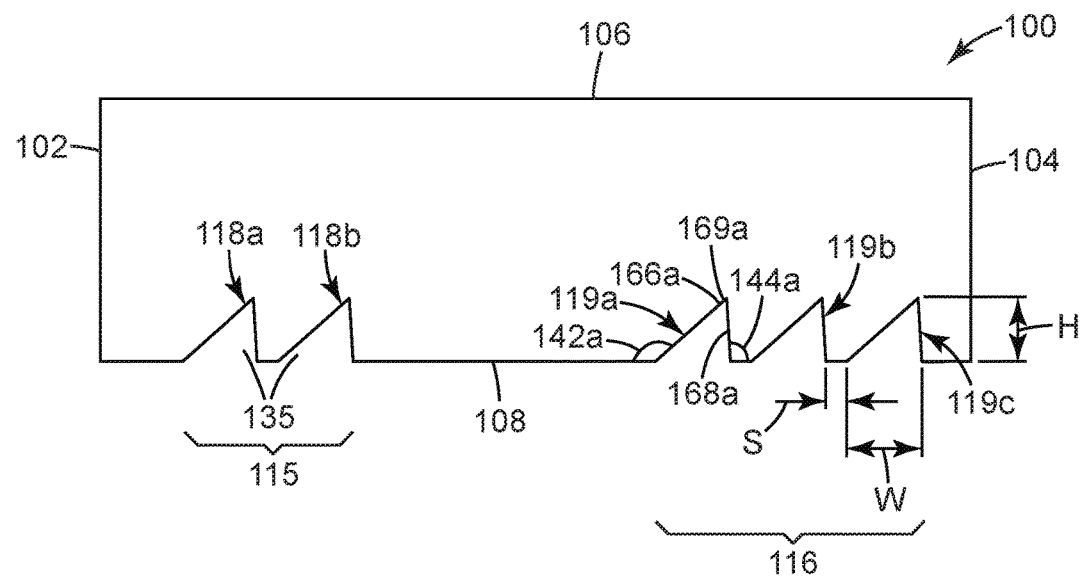
FIG. 1 is a schematic cross-section view of a light guide having multiplet extraction features.

In a conventional Liquid Crystal Display (LCD), a backlight generates a light output that passes through various optical films, such as a turning film or recycling films, and is used to illuminate an LCD panel. In conventional designs there is an air gap between the backlight and the optical films that are between the backlight and the LCD panel. This air gap is needed because the light output distribution of the backlight is strongly influenced by Total Internal Reflection (TIR) at the output face of the backlight. Removing the air gap by laminating the backlight to the optical films would change the index difference across the output surface of the backlight and thereby change the distribution of light into the optical films and into the LCD panel. This would allow shallow incidence light to enter the LCD panel that would have been reflected back into the backlight via TIR if an air gap were present. This shallow incident light is undesirable since, for example, it can reduce contrast, and so conventional LCD designs rely on an air gap.

In conventional LCD designs, the display is made to have sufficient stiffness by laminating a relatively thick (e.g. 800 microns) glass plate to the outer surface of the LCD panel. This has the effect of making the display heavy and thick.

As used herein, a first layer and a second layer may laminated by being adhered directly together through an adhesive layer or by being adhered together indirectly through one or more additional layers. For example, a first layer may be laminated to a second layer by adhering the first layer to a third layer with a first adhesive layer and adhering the third layer to the second layer with a second adhesive layer.

The Applicants have discovered backlights having light guides which allow air gaps between layers to be eliminated without generating undesired low angle light input into an LCD panel. The backlights allow laminated display units to be constructed that are thinner, stiffer and/or lighter than conventional display units. In some embodiments, the laminated display units include an LCD panel, which typically includes liquid crystal material disposed between two rigid glass plates, a light guide, which may be a polymeric material, laminated the LCD panel, and a high modulus layer laminated to the light guide opposite the LCD panel. The LCD panel and the high modulus layer provide opposing separated layers resulting in a high stiffness. This allows a display unit to be constructed which is thinner and lighter than conventional display units while maintaining or increasing the level of stiffness since a thick glass plate is not needed to provide a sufficient level of rigidity.

Additional applications of the light guides and lighting panels described herein are described in commonly assigned U.S. patent application Ser. No. 14/254,669, entitled "Light Guide" and filed on an even date herewith, which is hereby incorporated herein by reference in its entirety.

As used herein, "high modulus" refers to a Young's modulus greater than about 5 GPa. In some embodiments, the high modulus layer has a Young's modulus greater than about 5 GPa, or greater than about 10 GPa, or greater than about 30 GPa, or greater than about 50 GPa. Unless otherwise indicated, "modulus" of a material refers to the Young's modulus of the material in tension.

In some embodiment, the laminated display unit has a total thickness less than about 2 mm, less than about 1.5 mm, or less than about 1.3 mm or less than about 1.1 mm. The laminated display units are typically thicker than about 0.5 mm.

The rigidity of the laminated display unit can be characterized by supporting a display in a fixed region and measuring the deflection at the center of the display unit when a fixed force is applied at the center. In some embodiments, the laminated display unit measures at least 18 cm by 23.5 cm and exhibits a deflection of less than 35 microns (or less than 40 microns, or less than 30 microns or less than 25 microns) when subject to a 1 N load distributed over a circular area 1 cm in diameter in the center of a rectangular area of about 18 cm by 23.5 cm when the laminated display unit is supported at a boundary of the rectangular area.

In some embodiments, the laminated display unit has a total thickness less than 1.3 mm (or less than about 1.3 mm or less than about 1.1 mm) and exhibits a deflection of less than 35 microns (or less than 40 microns, or less than 30 microns or less than 25 microns) when subject to a 1 N load distributed over a circular area 1 cm in diameter in the center of a rectangular area of about 18 cm by 23.5 cm when the laminated display unit is supported at a boundary of the rectangular area.

Figure 10:
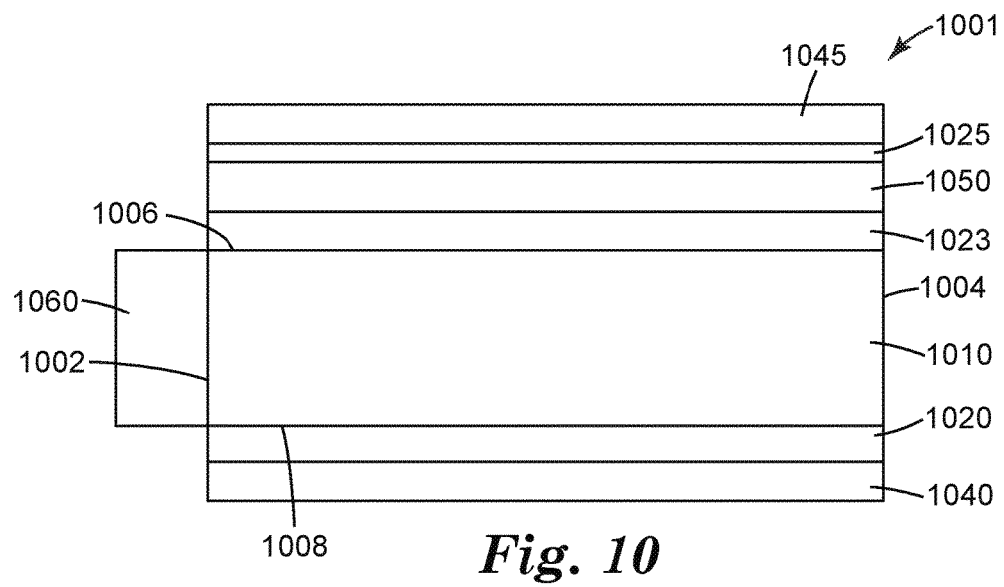
FIG. 10 is a schematic cross-section view of a display.

FIG. 10 shows display 1001 that includes light guide 1010 having input edge 1002, opposing edge 1004, first major surface 1006 and second major surface 1008. Display 1001 further includes first laminate component 1023, second laminate component 1020, first high modulus layer 1040 laminated to light guide 1010 adjacent second major surface 1008, LCD panel 1050 laminated to light guide 1010 adjacent first major surface 1006, and optional second high modulus layer 1045 laminated to LCD panel 1050 opposite light guide 1010 with optional third laminate component 1025. Optional second high modulus layer 1045 may be optionally included to provide additional rigidity or to provide a protective layer for LCD panel 1050. Optional second high modulus layer 1045, if included, is typically significantly thinner than glass layers used in conventional displays because the stiffened structure formed by LCD panel 1050 and first high modulus layer 1040 provides a high degree of rigidity without optional second high modulus layer 1045. Display 1001 further includes light source 1060 disposed to inject light into input edge 1002.

Optional second high modulus layer 1045 is a transparent layer that can be a glass layer, or can be sapphire, or can be a transparent composite material, which may include a hard coat, such as a diamond-like carbon coating, for scratch resistance. In many embodiments, optional second high modulus layer 1045 is thinner than glass layers used in conventional displays. For example, optional second high modulus layer 1045 may have a thickness in the range of about 100 to about 400 microns. In alternate embodiments where a very rigid display is desired, optional high modulus layer can be a thick (e.g., 800 microns) glass layer and may be an alkali-aluminosilicate glass, such as GORILLA glass (available from Corning Inc, Corning, N.Y.). Any of the materials that can be used for optional second high modulus layer 1045 can also be used for first high modulus layer 1040. However, first high modulus layer 1040 does not need to be transparent since it is on the opposite side of the light guide from LCD panel 1050 and so other materials, such as metals or composite sheets, can be used. Suitable composites include resin filled fiberglass, KEVLAR or carbon fiber sheets. For example, high modulus carbon fiber reinforced polymer (CFRP) has a modulus of about 420 GPa. Other suitable composites include alumina fiber reinforced metal composite sheets. An example is 3M AMC (3M Company, St. Paul, Minn.) material, which is NEXTEL 610 (3M Company, St. Paul, Minn.) fibers in aluminum. 3M AMC exhibits a modulus of about 210 GPa, which is approximately the same as steel. Some solid metal sheets may also be useful for the first high modulus layer. Examples include beryllium, which has a modulus of about 290 GPa and a relative density of 1.85, and titanium which has a modulus of 120 GPa. In some embodiments, first high modulus layer 1040 can have thickness from about 100 microns to about 1 mm.

In many embodiments, high modulus layers are chosen with thermal expansion coefficients similar to glass so as to not cause warping of the display with temperature.

In some embodiments, the outer frame or shell of the display device may be laminated to the first high modulus layer to further increase the stiffness of the display.

First laminate component 1023, second laminate component 1020, and optional third laminate component 1025 may each be a single adhesive layer or may include multiple layers. For example, any of the laminate components may be a stack of polymeric films with an adhesive layer at the top or bottom of the film stack. In some embodiments, one or more of the laminate components is a single layer of a silicone. First laminate component 1023 includes a first material that is immediately adjacent light guide 1010 and second laminate component 1020 includes a second material that is immediately adjacent light guide 1010. In embodiments where first laminate component 1023 is a single adhesive layer, the first material is the material of the adhesive layer. Similarly in embodiments where second laminate component 1020 is a single adhesive layer, the second material is the material of the adhesive layer.

Light source 1060 may be optically coupled to light guide 1010, through an optically clear adhesive, for example, or there may be an air gap between light source 1060 and light guide 1010.

In many embodiments, light guide 1010 is made from a polymeric material such as poly(methyl methacrylate) (PMMA). In some embodiments, light guide 1010 is made from a transparent high modulus material such as glass, sapphire or transparent composite materials. In this case, first high modulus layer 1040 may be omitted from the laminate. The thickness of first laminate component 1023 may be increased by including one or more polymeric spacing layers to further separate LCD panel 1050 and optional second high modulus layer 1045 from light guide 1010 which, in this embodiment, would serve as a component of the structure responsible for making the laminate rigid.

Figure 11:
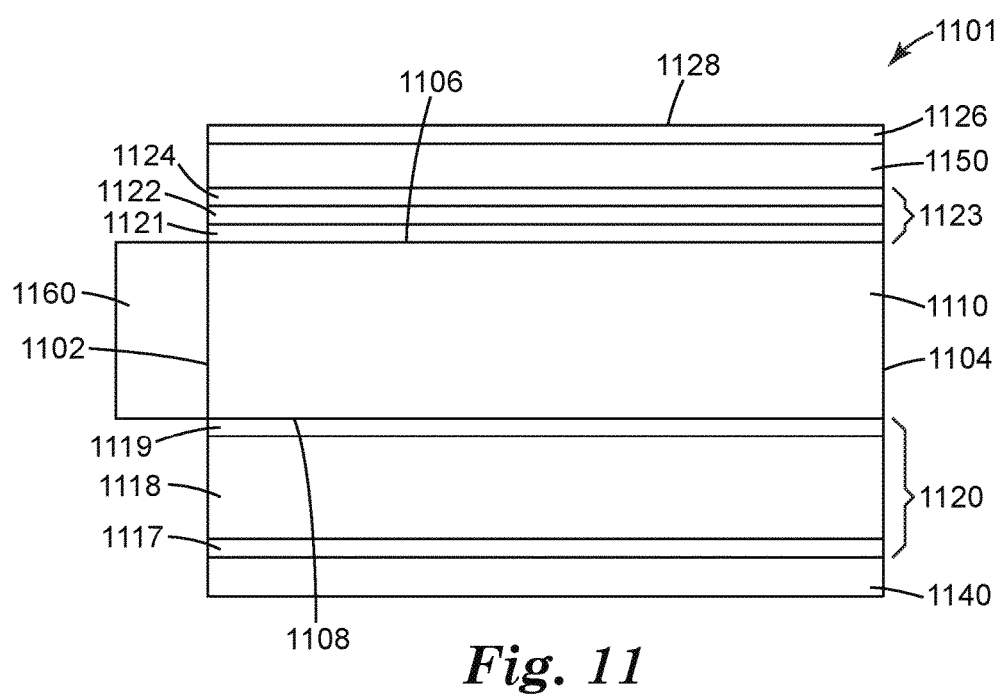
FIG. 11 is a schematic cross-section view of a display.

FIG. 11 shows display 1101 that includes light guide 1110 having input edge 1102, opposing edge 1104, first major surface 1106 and second major surface 1108. Display 1101 further includes first laminate component 1123, second laminate component 1120, first high modulus layer 1140 laminated to light guide 1110 adjacent second major surface 1108, LCD panel 1150 laminated to light guide 1110 adjacent first major surface 1106, and polymer layer 1126 laminated to LCD panel 1150 opposite light guide 1110. Polymer layer 1126 includes outer surface 1128 opposite LCD panel 1150. Polymer layer 1126 may be a hardcoat layer and may be included to provide a protective layer for LCD panel 1050. Suitable hardcoats include coatings that contain alkoxylated multi (meth)acrylate monomers such as those described in PCT Publication No. WO 2014/011731 (Pokorny, et al.).

First laminate component 1123 includes a first material 1121 immediately adjacent first major surface 1106, film 1122 adjacent first material 1121 opposite light guide 1110, and adhesive layer 1124 between film 1122 and LCD panel 1150. Film 1122 may include one or more optical films. For example, film 1122 may include a reflective polarizer, which may be a multi-layer optical film such as DBEF (available from 3M Company, St. Paul, Minn.). Film 1122 may include an absorbing polarizer and a reflective polarizer with the absorbing polarizer laminated to a major surface of a reflective polarizer opposite light guide 1110.

Second laminate component 1120 includes second material 1119, film 1118 and adhesive layer 1117. Film 1118 may include a reflector, such as Enhanced Specular Reflector (ESR) available from 3M Company (St. Paul, Minn.). ESR is a multilayer polymeric optical film. Film 1118 may be a polymeric spacer layer that is included to increase the spacing between LCD panel 1150 and first high modulus layer 1140 to increase the overall rigidity of display 1101. Film 1118 may be a film stack and may include one or more polymeric films. For example, film 1118 may include an ESR film laminated to a polymeric spacer layer.

Light source 1160 and light guide 1110 together form a lighting panel for display 1101. Such lighting panels may also be useful in lighting application other than displays. Unless otherwise indicated, references to "lighting panels" or "backlights" are also intended to apply to other extended area lighting devices that provide nominally uniform illumination in their intended application. Such other devices may provide either polarized or unpolarized outputs. Examples include light boxes, signs, channel letters, and general illumination devices designed for indoor (e.g. home or office) or outdoor use, sometimes referred to as "luminaires."

In embodiments where all extractors are on the same side of the light guide, the reflector can be omitted. In some embodiments, light source 1160 and light guide 1110 together form a transparent luminaire or lighting panel that can be used as a front light in front-lit displays. For example, such a front light can be used in e-readers and may be placed under an easy-clean glass so that fingerprints do not cause light extraction. In some embodiments, light guide 1110 may be laminated to the front (output side) of a reflective display and first high modulus layer 1140 may be a transparent layer that is laminated to the light guide opposite the reflective display. The reflective display may be a reflective LCD panel or may be a reflective display based on other technologies, such as electrophoretic ink. In some embodiments, a touch panel may be laminated to first high modulus layer 1140 opposite light guide 1110. In some aspects of the present description, the transparent luminaire provided by light guide 1110 may be laminated to or between glass panels and may be used as or with a window such as a skylight.

One or both of first material 1121 and second material 1119 may be a low index adhesive, such as a silicone adhesive, a nanovoided material, a sol-gel, an aerogel, a fluorinated material or the like. As discussed in detail elsewhere, light guide 1110 may include a plurality of extraction features which may be indented features. In embodiments where second major surface 1108 includes such indented extraction features, it is preferred that second material 1119 be selected so that the indented extraction features are not filled in with second material 1119 upon lamination and use. Similarly, in embodiments where first major surface 1106 includes indented extraction features, it is preferred that first material 1121 be selected so that the indented extraction features are not filled in with first material 1121 upon lamination and use. In particular, it is preferred that air pockets remain within the indented extraction features after lamination. Suitable adhesive that achieves this result include low index solid adhesive layer such as a pressure sensitive adhesive (PSA) film, such as a silicone PSA film.

First material 1121 has a refractive index $n_1$ and second material 1119 has a refractive index $n_2$. Unless otherwise specified, as used herein refractive index refers to refers to refractive index measurements using light having a wavelength of 532 nm at 25° C. and atmospheric pressure. First material 1121 and second material 1119 may be the same or may be different. Although it may be advantageous from an optics standpoint to use a material with the lowest possible index of refraction on both sides of the light guide, it may be preferred from process considerations to use different materials for first material 1121 and second material 1119. As noted, when indented extraction features are included, it is preferred that air pockets form within the indented extraction features upon lamination. In embodiments where one major surface of the light guide is structured with indented extraction features (for example, second major surface 1108 of light guide 1110) and the opposite major surface is not structured (for example, first major surface 1106 of light guide 1110), it may be preferred that the material immediately adjacent the structured major surface (for example, second material 1119) is applied by lamination of a low index solid adhesive layer such as a PSA film. The material immediately adjacent the unstructured opposite major surface (for example, first material 1121) may be any material having a low refractive index, such as solution coated materials. For example, low index fluorocarbon layers can be applied by coating from a solvent solution. Similarly, ultra low index nanovoided layers can also be deposited from solution. Suitable nanovoided materials are described in U.S. Application Publication No. 2012/0038990 (Hao et al.), for example. Solution coated materials are suitable for depositing on an unstructured major surface of the light guide that does not contain indented extraction features, but may not be preferred for structured surfaces that include indented extraction features.

In some embodiments, first major surface 1106 is unstructured while second major surface 1108 includes indented extraction features. Using a low index, solution coated layer on first major surface 1106 is useful for creating TIR for as much light as possible between light guide 1110 and first material 1121. A small amount of light (for example, 1 or 2 percent) may be lost from the bottom of the light guide (second major surface 1108) with little decrease in display performance. However, even a small amount of high angle light leaking out of light guide 1110 into LCD panel 1150 can decrease the contrast of the display if it scatters from the various metal lines and features of each pixel. Thus it is desired that the leakage of high angle light into the LCD panel be minimized as much as possible. This may be achieved by using a low index, solution coated layer as first material 1121 on first major surface 1106.

The larger of the refractive index of first material 1121, $n_1$, and second material 1119, $n_2$ is herein denoted $n_{max}$. In some embodiments, the light injected into the light guide is at least partially collimated such that at least 90%, or at least 95% or at least 98% or at least 99%, of the light injected into the light guide has an angle relative to a plane substantially parallel to a center plane of the light guide (for example, center plane 207 of light guide 200) that is no more than about the inverse cosine of $n_{max}/n_g$. This ensures that most of the light injected into the light guide undergoes TIR at interfaces where the light is not extracted by extraction features.

For silicone PSAs, $n_1$ and/or $n_2$ may be about 1.41. For nanovoided materials, $n_1$ or $n_2$ may be about 1.2. For PMMA light guides, $n_g$ may be about 1.49. In some embodiments, $n_1$ is in a range of about 1.2 to about 1.5, $n_2$ is in a range of about 1.2 to about 1.5, and $n_g$ is greater than about $n_{max}$ divided by the cosine of θ, where θ is an angle related to the degree of collimation of the light source. The angle θ may be 5 degrees, 20 degrees, 25 degrees, or 30 degrees. In some embodiments, $n_g$ is greater than about 1.05 times $n_{max}$, or greater than about 1.1 times $n_{max}$, or greater than about 1.15 times $n_{max}$, or greater than about 1.2 times $n_{max}$, or greater than about 1.25 times $n_{max}$, or greater than about 1.3 times $n_{max}$. In some embodiments, $n_g$ divided by $n_{max}$ is in a range of about 1.05 to about 1.4.

In some embodiments, the light source is at least partially collimated such that at least 90%, or at least 95% or at least 98% or at least 99%, of the light injected in to the light guide has an angle relative to a plane substantially parallel to a center plane of the light guide that is no more than about 5 degrees, no more than about 20 degrees, no more than about 25 degrees, or no more than about 30 degrees. In some embodiments, collimation is provided by single or multi-faceted tapered collimating structures included in light source 1160. Such collimating structures include linear, segmented linear, parabolic, compound parabolic or other structures. The structures may collimate or partially collimate in one direction or in two directions. In some embodiments, a laser light source is used. Such a light source can inject light into the light guide with an angle relative to a plane substantially parallel to a center plane of the light guide that is no more than about 5 degrees.

Figure 14A:
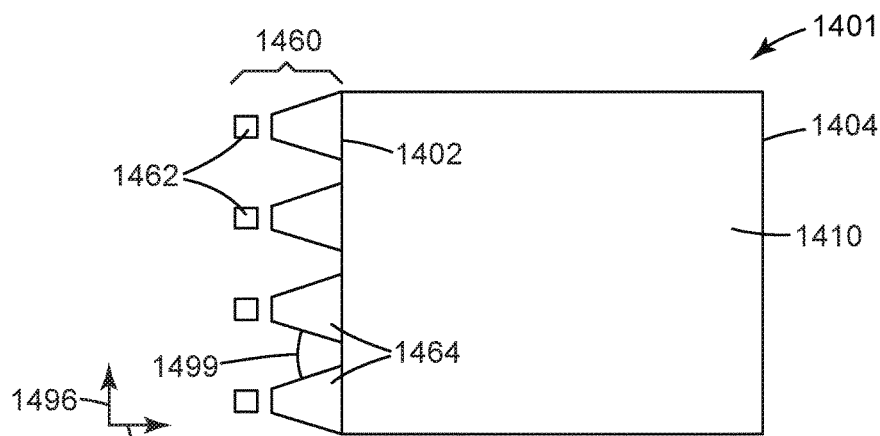
FIG. 14A is a schematic top view of a backlight.
Figure 14B:
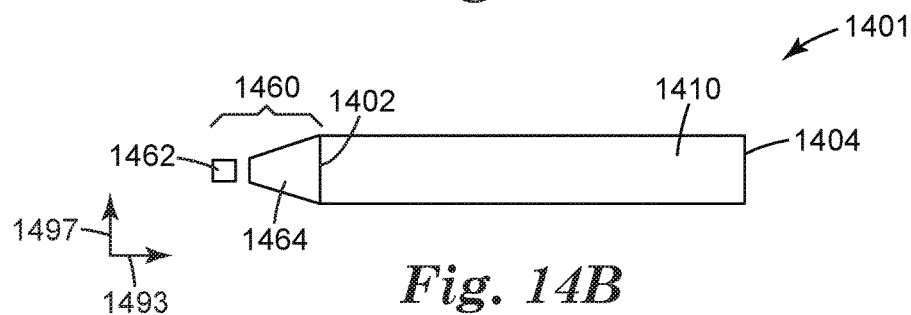
FIG. 14B is a schematic side view of a backlight.

Collimating structures are illustrated in FIGS. 14A-14B, which shows backlight 1401 including light guide 1410 having input edge 1402 and opposing edge 1404 and light source 1460. Light source 1460 is disposed to inject light into input edge 1402. Light source 1460 includes light emitting components 1462 and light collimating elements 1464. Light emitting components 1462 may be light emitting diodes (LEDs). Many LEDs, such as LEDs with phosphor coatings, produce substantially Lambertian light. Collimating elements 1464 may be used to provide collimation for light output from LEDs. The light guide 1410 has a propagation direction 1493 from input edge 1402 to opposing edge 1404, a width direction 1496 (in-plane direction orthogonal to propagation direction 1493), and a height direction 1497. In the embodiment illustrated in FIGS. 14A-14B, light collimating elements are linear tapers that taper in both the width direction 1496 as shown in FIG. 14A and in the height direction 1497 as shown in FIG. 14B. Light emitting components 1462 may be a plurality of light emitting diodes. The light collimating elements 1464 may have an aspect ratio of 2:1 or higher, for example 3:1. The light collimating elements 1464 may be attached to the light guide 1410 or may be separate.

Figure 12A:
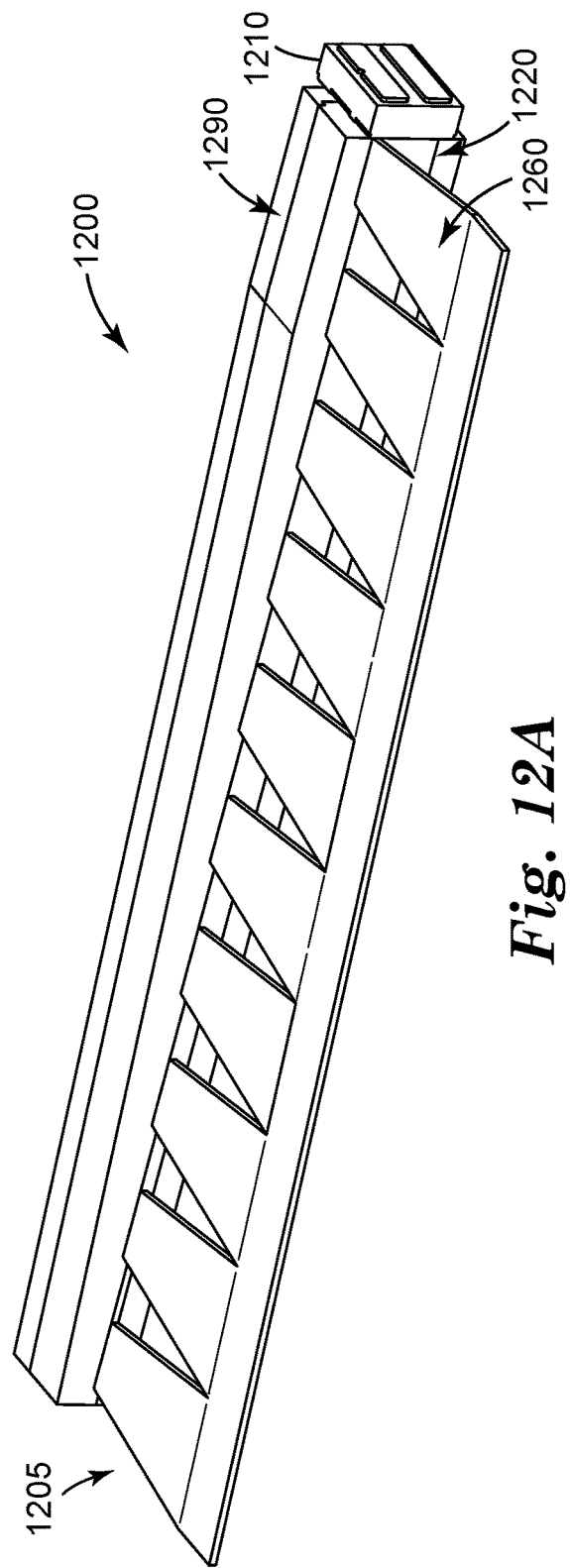
FIG. 12A is an isometric view of a light source.
Figure 12B:
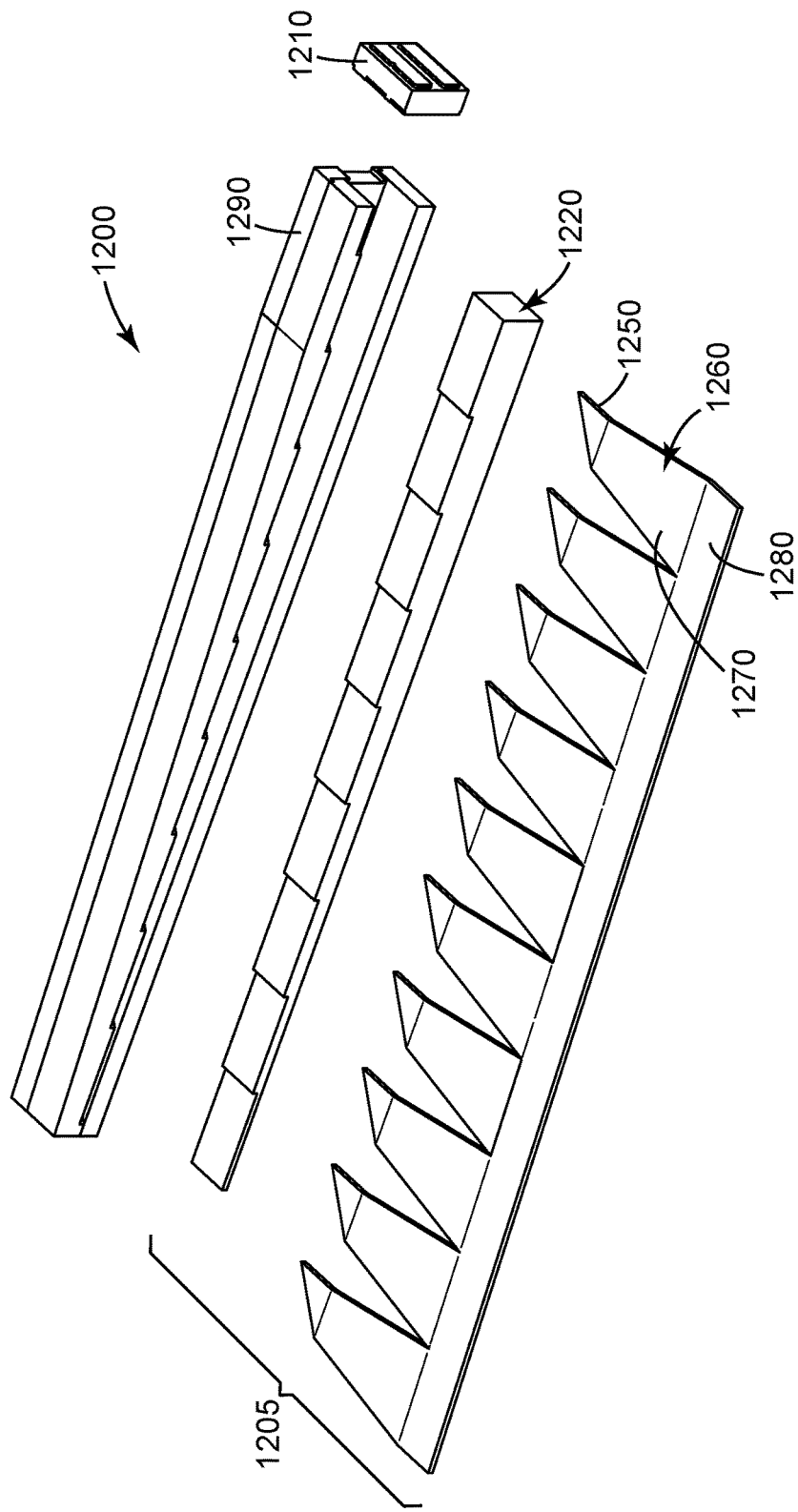
FIG. 12B is an exploded view of the light source of FIG. 11A.

Examples of collimated light sources suitable for use in the present description are provided by the anamorphic light sources described in PCT Publication WO 2013/122728 (Ouderkirk et al.) and PCT Application No. U.S. 2013/073305, filed Dec. 5, 2013 and entitled "Anamorphic Optical Package", both of which are hereby incorporated herein by reference in their entirety. An example of an anamorphic light source suitable for use in the present description is illustrated in FIGS. 12A and 12B. FIG. 12A shows an isometric view of an exemplary optical package 1200. FIG. 12B shows an exploded view of optical package 1200. Optical package 1200 includes a light emitting component 1210, a converter unit 1205, and a housing 1290. Light emitting component 1210 provides a source of light for the optical package 1200. Converter unit 1205 includes an anamorphic light guide 1220 that guides the light from light emitting component 1210 into a diverter/concentrator element 1260. The diverter/concentrator element 1260 includes a diverter portion 1250 which receives and diverts segments of the light guided by the anamorphic light guide 1220 into a coupling portion 1270. Light is further directed through the coupling portion 1270 into a concentrator portion 1280 of the diverter/concentrator element 1260. The optical package 1200 efficiently couples light from the light emitting component and provides output light with a larger aspect ratio that can be optionally partially collimated in at least one direction. In addition, the effective height of the output light is substantially lower than the effective height of the light emitted from the light emitting component. In the embodiment shown in FIGS. 12A and 12B, diverter portion 1250 is an array of diverter elements (diverter array).

Optical package 1200 includes converter unit 1205 which converts light emitted from light emitting component 1210, which has a first aspect ratio of less than about 10:1, such as about 1:1 to about 1:2, into an output light beam having a second aspect ratio that is larger than the first aspect ratio. For example, the second aspect ratio may be at least twice (or four times or five times) that of the light emitting component. In some embodiments, concentrator portion 1280 outputs light having an aspect ratio of at least 20:1 or greater. In some embodiments, converter unit 1205 produces a line-shaped output beam. The output beam may be substantially collimated in at least one direction and, in some embodiments, can be substantially collimated in two directions. The output light from converter unit 1205 has a lower effective height (beam physical height×full-width-half-maximum angle of the light emitted parallel to the height axis) than the effective height of the light output from light emitting component 1210.

Optical package 1200 can be made using the techniques described in PCT Publication WO 2013/122728. In some embodiments, a unitary construction of converter unit components can be formed using compression or compression-injection molding for diverter portion 1250 and anamorphic light guide 1220.

Figure 13:
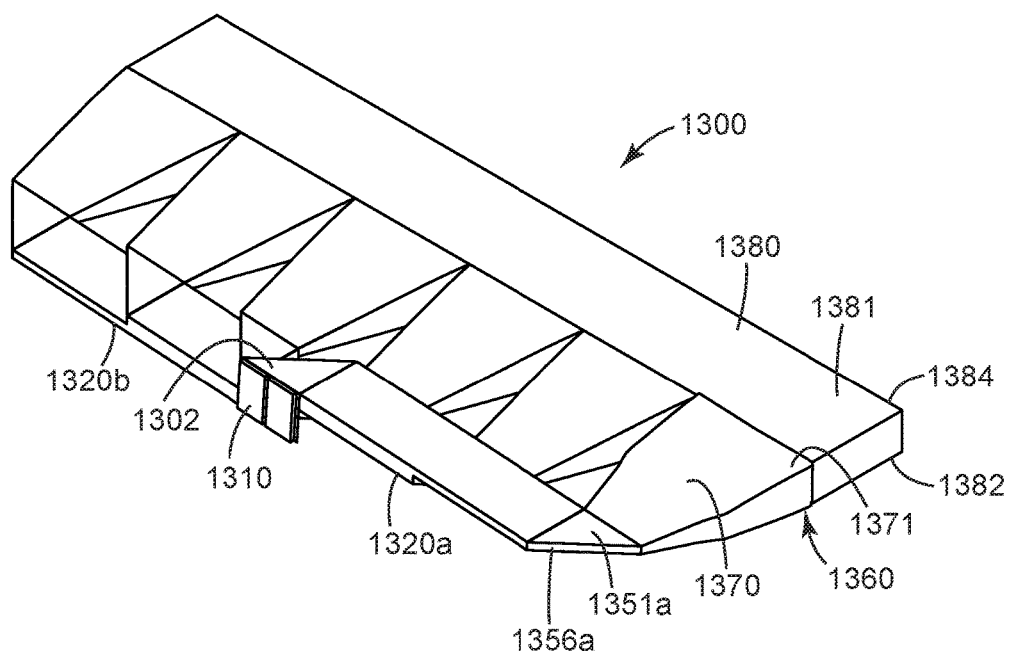
FIG. 13 is an isometric view of a light source.

Coupling portion 1270 receives light exiting the diverter portion 1250. Coupling portion 1270 comprises a series of bodies expanding in one or more dimensions, e.g., trapezoidally-shaped coupling or coupler bodies. The bodies can have a generally planar shape or the coupler bodies can have a tapered shape, such as shown in FIG. 13. In some alternative aspects, the taper may be linear or the taper may be non-linear in at least one axis. A suitable non-linear profile may include a parabola. The taper feature helps capture light that passes directly through the diverter portion (without being diverted by the reflecting surface). In addition, the taper design of the coupling portion collimates the light that passes directly through the diverter portion. Light is guided within coupling portion 1270 via TIR. Thus, coupling portion 1270 can collimate the light in the plane of the coupling portion (i.e., in the plane parallel to the major surfaces of the coupling portion).

FIG. 13 shows another exemplary optical package 1300 that can be used by itself or as a module in combination with other similar optical package modules to illuminate a display or other device. Optical package 1300 includes a light emitting component 1310 and a converter unit that includes an anamorphic light guide and diverter/concentrator unit 1360 having a series of diverters, including diverter 1351*a*, a coupling portion 1370 and a concentrator portion 1380. A housing is omitted from the figure for simplicity. Light emitting component 1310 provides a source of light for the optical package 1300 and is disposed at a central location along the anamorphic light guide. In this aspect, light emitting component 1310 includes two LEDs. In this aspect, the anamorphic light guide is divided into two parts (or smaller light guides) 1320*a* and 1320*b* disposed on either side of the light emitting component 1310. In this arrangement, a first reflective surface 1302, which can be formed on a right angle prism or a surface of the housing (not shown), is provided to reflect at least a portion of the light emitted from the light emitting component 1310 into the anamorphic light guide 1320*a*. A second reflective surface (not shown) can be disposed underneath first reflective surface 1302, to reflect another portion of the light emitted from light emitting component 1310 into anamorphic light guide 1320*b*. The anamorphic light guides 1320*a*, 1320*b* guide the light from light emitting component 1310 into a diverter/concentrator element 1360.

In this aspect, the anamorphic light guide 1320*a*, 1320*b* has a shorter length than anamorphic light guide 1220, although the general design and structure is the same as described above. The diverter/concentrator element 1360 includes a diverter portion which receives and diverts segments of the light guided by the anamorphic light guide 1320*a*, 1320*b* into a coupling portion 1370. In this aspect, the diverter portion includes six diverters (only diverter 1351*a* is shown), each having a reflecting face 1356 (e.g., face 1356*a* is shown in FIG. 13) that changes the light direction by approximately 90°, and guides light into a coupling section 1370 of the diverter/concentrator 1360. In this aspect, the diverter portion includes a gap between adjacent diverters. This diverter spacing can provide more straightforward construction of the optical package in that this configuration provides more room for the coupling bodies at the output faces of the diverters.

Light is further directed through the coupling portion 1370 into a concentrator portion 1380 of the diverter/concentrator element 1360. Coupling portion 1370 comprises a series of coupling bodies expanding in one or more dimensions, e.g., trapezoidally-shaped bodies (such as coupling body 1371). In this aspect, the bodies include tapers in multiple directions, as the taper linearly expands horizontally (in plane) and parabolically expands vertically (normal to the plane of the diverter bodies) towards the concentrator 1380. This taper feature helps capture light that passes directly through the diverter portion (without being diverted by the reflecting surface). Light is guided within coupling portion 1370 via TIR. In this particular aspect, an air gap may or may not exist between the exit face of the diverter portion and the input face of the coupling portion.

Light exiting coupling portion 1370 enters concentrator portion 1380. In this aspect, concentrator 1380 comprises a rectilinear body having no taper, such that concentrator major surfaces 1381 and 1382 are generally parallel with each other and generally perpendicular to output surface 1384. The concentrator 1380 may be made from a continuous molded article using the construction materials described above. With this configuration, the center of the light emitting component 1310 is aligned or coincident with the center of the concentrator 1380 in height, thus allowing for a reduced overall package size.

Light sources that can be used in the present description may include light emitting diodes (LEDs). "Light emitting diode" or "LED" refers to a diode that emits light, whether visible, ultraviolet, or infrared, where the emitted light will have a peak wavelength in a range from about 430 to 700 nm. The term LED includes incoherent light sources that are encased or encapsulated semiconductor devices marketed as "LEDs", whether of the conventional or super radiant variety, as well as coherent semiconductor devices such as laser diodes, including but not limited to vertical cavity surface emitting lasers (VCSELs). An "LED die" is an LED in its most basic form, i.e., in the form of an individual component or chip made by semiconductor processing procedures. For example, the LED die may be formed from a combination of one or more Group III elements and of one or more Group V elements (III-V semiconductor). Examples of suitable III-V semiconductor materials include nitrides, such as gallium nitride, and phosphides, such as indium gallium phosphide. Other types of materials can also be used, as well as materials from other groups of the periodic table. The component or chip can include electrical contacts suitable for application of power to energize the device. Examples include wire bonding, tape automated bonding (TAB), or flip-chip bonding. The individual layers and other functional elements of the component or chip are typically formed on the wafer scale, and the finished wafer can then be diced into individual piece parts to yield a multiplicity of LED dies. The LED die may be configured for surface mount, chip-on-board, or other known mounting configurations. Some packaged LEDs are made by forming a polymer encapsulant over an LED die and an associated reflector cup. The LED may be grown on one of several substrates. For example, GaN LEDs may be grown by epitaxy on sapphire, silicon, and gallium nitride. LEDs used with the present description may include high powered GaN LEDs having GaN substrates such as those available from Soraa, Inc., Fremont, Calif. An "LED" for purposes of this description should also be considered to include organic light emitting diodes, commonly referred to as OLEDs.

As used herein, a multiplet of extraction features refers to two or more extraction features where the space between extraction features is smaller than the width of the extraction features and is smaller than the space between neighboring multiplets. In some embodiments, the extraction features have a width that varies along the length of the extraction features and a gap between the extraction features in a multiplet that varies along the length of the multiplet. In these cases, a multiplet of extraction features is to be understood to mean two or more extraction features where the smallest space between extraction features is smaller than the maximum width of the extraction features and is smaller than the space between neighboring multiplets. In some embodiments, the minimum space between extraction features within a multiplet is less than 0.5 or less than 0.25 or less than 0.1 times the maximum width of an extraction feature.

FIG. 1 shows light guide 100 having input edge 102, opposing edge 104, first major surface 106 and second major surface 108. Second major surface 108 includes multiplets 115 and 116. Multiplet 115 includes two extraction features 118a and 118b and multiplet 116 includes three extraction features 119a, 119b and 119c. Extraction feature 119c has a height H, a width W, and there is a spacing S, which is smaller than W, between extraction features 119b and 119c. In some embodiments, the thickness or height, H, of the extraction features may be in a range of about 1 micron to about 30 microns or in a range of about 2 microns to about 20 microns or in a range of about 5 microns to about 15 microns. In some embodiments, the width, W, of the extraction features may be in a range of about 1 micron to about 30 microns or in a range of about 2 microns to about 20 microns or in a range of about 5 microns to about 15 microns.

Extraction features 118a and 118b have an indented geometry and form air pockets 135 between the interior of the extraction features and second major surface 108. As used herein, indented geometry refers to the geometry of features that extend from a surface of a material toward the interior of the material (for example, extraction feature 118a of FIG. 1).

Extraction feature 119a has first surface 166a facing input edge 102, second surface 168a facing opposing edge 104 and an apex 169a. First surface 166a makes a first angle 142a with second major surface 108 on the side of first surface 166a facing input edge 102 and second surface 168a makes a second angle 144a with second major surface 108 on the side of second surface 168a facing opposing edge 104. In some embodiments, first angle 142a is in a range of about 110 degrees to about 150 degrees or in a range of about 120 degrees to about 145 degrees. First surface 166a may have a curvature so that first angle 142a varies from a lower value near the base at second major surface 108 to a higher value near apex 169a. For example, first angle 142a may be in a range of about 120 to about 130 degrees near second major surface 108 and in a range of about 135 degrees to about 145 degrees near apex 169a. In some embodiments, second angle 144a may be in a range of about 90 to about 120 degrees or in a range of about 90 to about 110 degrees. In some embodiments, each extraction feature has an asymmetric shape as illustrated in FIG. 1.

First surface 166a defines a first slope with respect to a direction extending from input edge 102 to opposing edge 104 along second major surface 108. Second surface 168a defines a second slope with respect to a direction extending from input edge 102 to opposing edge 104 along second major surface 108. In some embodiments, the magnitude of the second slope is larger than the magnitude of the first slope. The first slope may be in a range of about 0.5 to about 1.5 and may vary from a lower value near the base at second major surface 108 to a higher value near apex 169a. The second slope may be in a range of about −1.5 to about −150.

Light guide 100 can be made by hot pressing a polymer sheet between a flat and smooth plate, such as a polished chrome plate, and a structured stamping tool, such as a structured nickel stamping tool. Suitable polymers include PMMA or other acrylic polymers, cyclic olefin polymer (COP), such as ZEONOR 1420R (Zeon Chemicals, Louisville, Ky.), polycarbonate, CR-39 (allyl diglycol carbonate), and polystyrene. Suitable stamping tools can be prepared by machining, such as by single point diamond machining. Exemplary diamond turning systems and methods can include and utilize a fast tool servo (FTS) as described in, for example, PCT Published Application No. WO 00/48037 (Campbell et al.), and U.S. Pat. No. 7,350,442 (Ehnes et al.) and U.S. Pat. No. 7,328,638 (Gardiner et al.).

The approaches described herein provides for extraction features that are easier to fabricate than approaches which use a combination of a positive (apex facing out with respect to the light guide) and a negative (apex facing in with respect to the light guide) shaped prisms. In contrast to this, preferred embodiments of the present description provide light guides where all extraction features have an indented geometry. In some embodiments, the indented extraction features have an apex pointing inward toward the bulk of the light guide. The molds needed for shaping a polymeric light guide with extraction features are much easier to fabricate if all extraction features have an indented geometry.

In some embodiments each extraction feature in a multiplet are substantially identical, but the geometries of the multiplets vary from the input edge 102 to the opposing edge 104. For example extraction feature 118a may be substantially identical to extraction feature 118b, but extraction feature 118a may differ from extraction feature 119a. In some embodiments, all multiplets are doublets having two extraction features, in other embodiments all multiplets are triplets having three extraction features. In still other embodiments, a combination of doublets and triplets may be used or multiplets with four or more extraction features may be used.

Figure 2:
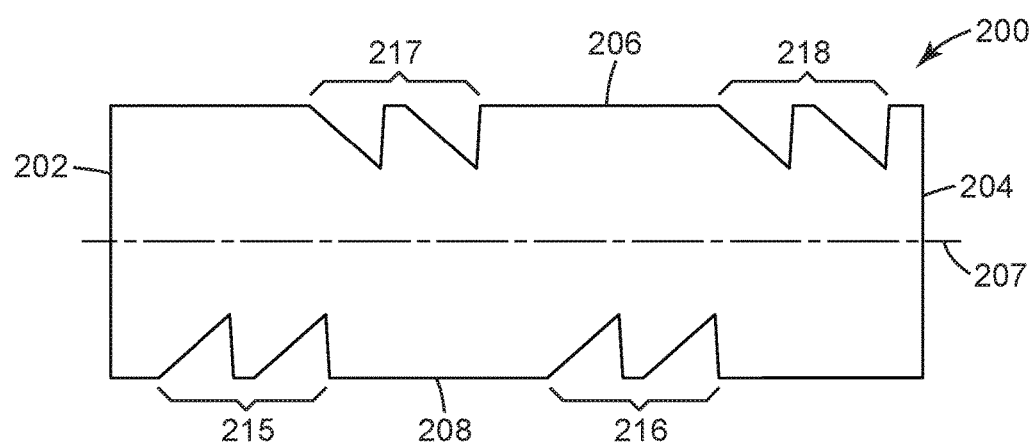
FIG. 2 is a schematic cross-section view of a light guide having multiplet extraction features.

FIG. 2 shows light guide 200 having input edge 202, opposing edge 204, first major surface 206 and second major surface 208. Second major surface 208 includes multiplets 215 and 216, and first major surface 206 include multiplets 217 and 218. Also shown in FIG. 2 is the center plane 207 of light guide 200. Light guide 200 can be used with an LCD display positioned above first major surface 206 and a mirror below second major surface 208. Light input into input edge 202 is redirected by multiplets 215 and 216 towards the LCD panel and light input into input edge 202 is redirected by multiplets 217 and 218 towards the mirror which then reflects the light towards the LCD panel. In some embodiments, multiplets are included in both major surfaces of the light guide as shown in FIG. 2. In other embodiments, multiplets are included in only the first major surface 206 or only in the second major surface 208.

The extraction features may have geometries that vary from the input edge of the light guide to the opposing edge. For example, an extraction feature may have a geometry with a central region having a relatively large height, H, that is nearly constant in the central region but tapers to zero in tapered regions near the edges of the extraction feature. The width, W, may also be approximately constant in the central region and taper to zero at the edges of the extraction feature. Multiplets near the input edge to the light guide, may have a small central region and large tapered regions so that a relatively small amount of incident light is extracted, while multiplets near the opposing edge may have a large central region and small tapered regions so that a relatively large amount of incident light is extracted. Such an arrangement can be used to generate a substantially uniform illumination since the light intensity near the input edge is substantially higher than the light intensity near the opposing edge.

Figure 3A:
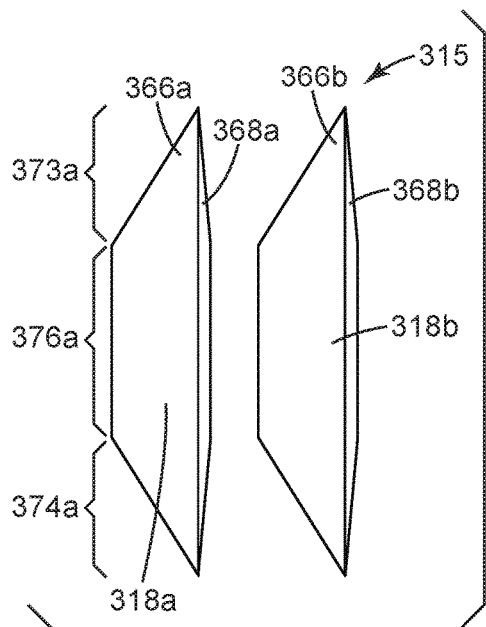
FIG. 3A is a top view of a multiplet.
Figure 3B:
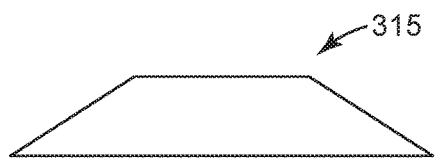
FIG. 3B is a side view of the multiplet of FIG. 3A.
Figure 4A:
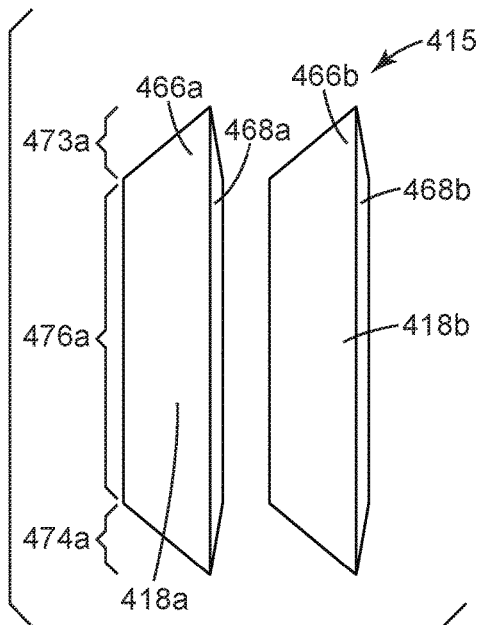
FIG. 4A is a top view of a multiplet.
Figure 4B:
FIG. 4B is a side view of the multiplet of FIG. 4A.
Figure 5A:
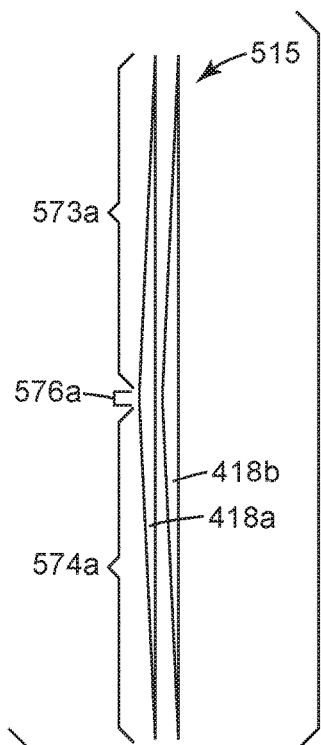
FIG. 5A is a top view of a multiplet.
Figure 5B:
FIG. 5B is a side view of the multiplet of FIG. 5A.

This is illustrated in FIGS. 3A-5B. FIGS. 3A and 3B show a top view and a side view of multiplet 315, respectively, which in this case is a doublet having two extraction features 318a and 318b. Extraction feature 318a includes first surface 366a and second surface 368a. Similarly, extraction feature 318b includes first surface 366b and second surface 368b. Extraction feature 318a includes a first tapered region 373a, a second tapered region 374a and a central region 376a. In this case, central region 376a is comparable in size to first and second tapered regions 373a and 374a. Extraction feature 318b includes similar regions. Multiplet 315 may be used in a center region of a light guide between an input edge and the opposing edge. FIGS. 4A and 4B show a top view and a side view of multiplet 415 which includes extraction features 418a and 418b. Extraction feature 418a includes first surface 466a and second surface 468a. Similarly, extraction feature 418b includes first surface 466b and second surface 468b. Extraction feature 418a includes a first tapered region 473a, a second tapered region 474a and a central region 476a. In this case, central region 476a is significantly larger than first and second tapered regions 473a and 474a. Extraction feature 418b includes similar regions. Multiplet 415 may be used in a region of a light guide near an edge opposite the input edge. FIG. 5A shows a top view of multiplet 515, which includes extraction features 518a and 518b. Extraction feature 518a includes a first tapered region 573a, a second tapered region 574a and a central region 576a. In this case, central region 576a is much smaller than first and second tapered regions 573a and 574a. Extraction feature 518b includes similar regions. Multiplet 515 may be used in a region of a light guide near an input edge. FIG. 5B shows a side view of multiplet 515.

Various geometric features of the multiplets may vary from an input edge of a light guide to the opposing edge in order to produce a uniform light output. These features include the shape of the extraction features, for example the length of a central region relative to the length of tapered regions, the length of the extraction features, one or more spacings between extraction features, and combinations thereof.

In some embodiments, the length of the multiplets vary from an input edge of a light guide to the opposing edge in order to produce a uniform light output. This is illustrated in FIG. 6A, which shows light guide 600 having input edge 602, opposing edge 604 and a plurality of multiplets 615. The extraction features of multiplets 615 have a length that increases from input edge 602 to opposing edge 604. In some embodiments, neighboring extraction features along the length direction may have a shape given by merging two shorter extraction features to give a longer extraction feature having a narrow region in the center from the merger of two tapered regions. This is illustrated in FIG. 6B which shows a portion of a multiplet consisting of extraction feature 618a and 618b in the merged region.

In some embodiments, the extraction features are skewed or tilted so that they are not orthogonal to the light propagation direction. This is illustrated in FIG. 6C, which shows light guide 600c having input edge 602c, opposing edge 604c and a plurality of multiplets 615c. The light guide has a propagation direction 693 directed from input edge 602 to opposing edge 604 and an orthogonal direction 696. Multiplets 615c extend in a direction at an angle 677 from the in-plane direction 696 orthogonal to the propagation direction 693. In some embodiments, the extraction features extend in a direction at an angle 677 from about 0 degrees to about 45 degrees from an in-plane direction 696 orthogonal to a direction 693 from the input edge 602c to the opposing edge 604c. Tilting the extraction features can allow the output of the light guide to be at least partially collimated in a direction that is not normal to the display surface. This may be useful for certain types of displays such as a watch display.

Figure 7:
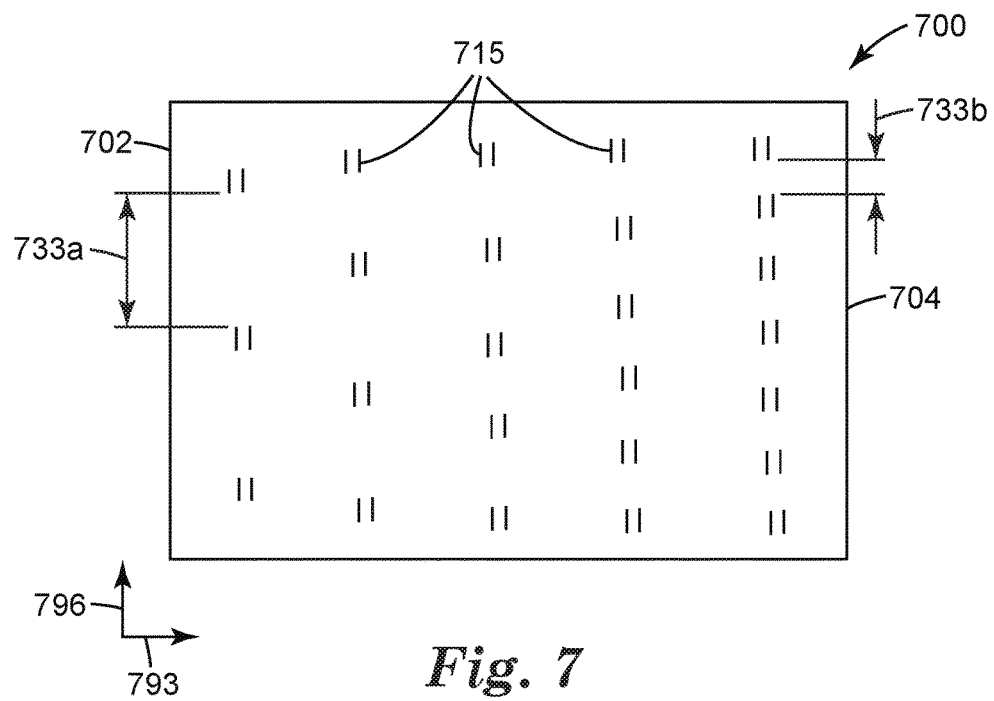
FIG. 7 is a schematic top view of a light guide having a multiplet extraction features.
Figure 8:
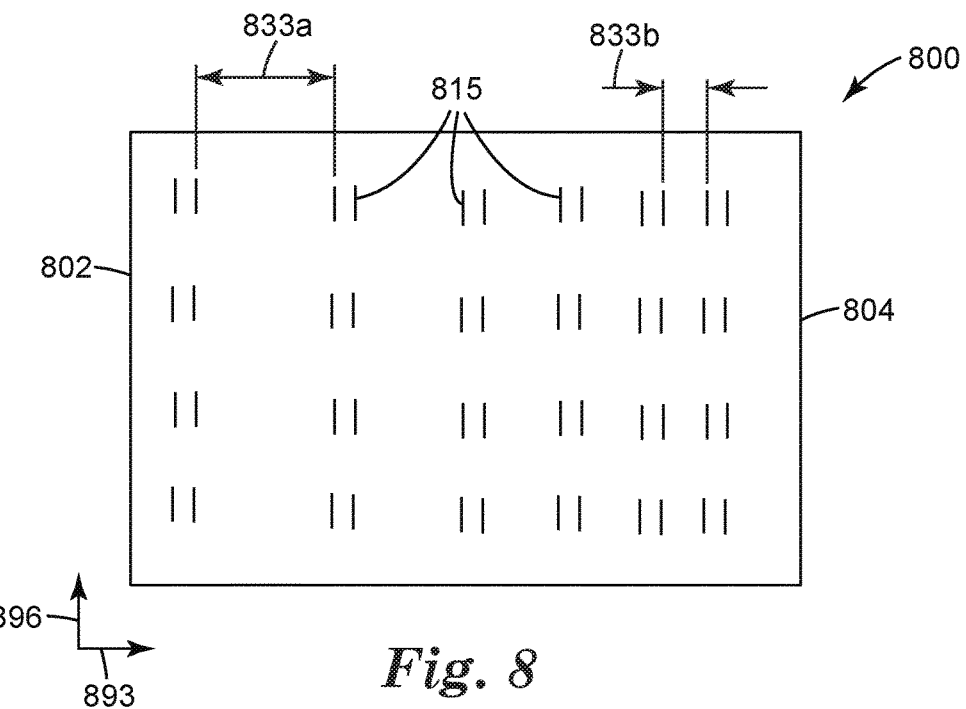
FIG. 8 is a schematic top view of a light guide having a multiplet extraction features.

In some embodiments, the spacing between the multiplets vary from an input edge of a light guide to the opposing edge in order to produce a uniform light output. The spacing may vary in the light propagation direction, or the spacing may vary in the direction orthogonal to the light propagation direction, or the spacing may vary in both directions. This is schematically illustrated in FIGS. 7 and 8. FIG. 7 shows light guide 700 having input edge 702, opposing edge 704 and a plurality of multiplets 715. The light guide has a propagation direction 793 directed from input edge 702 to opposing edge 704 and an orthogonal direction 796. The spacing between adjacent multiplets 715 in orthogonal direction 796 decreases from input edge 702 to opposing edge 704. For example, spacing 733a near input edge 702 is larger than spacing 733b near opposing edge 704. FIG. 8 shows light guide 800 having input edge 802, opposing edge 804 and a plurality of multiplets 815. The light guide has a propagation direction 893 directed from input edge 802 to opposing edge 804 and an orthogonal direction 896. The spacing between adjacent multiplets 815 in propagation direction 893 decreases from input edge 802 to opposing edge 804. For example, spacing 833a near input edge 802 is larger than spacing 833b near opposing edge 804.

Figure 9A:
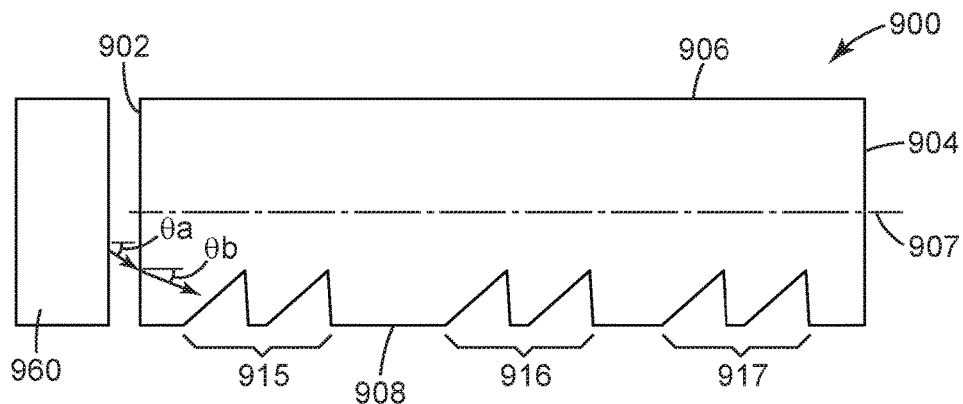
FIG. 9A is a schematic cross-section view of a lighting panel.

FIG. 9A shows a lighting panel, which may be, for example, a backlight or a front light, including light guide 900 and light source 960. Light guide 900 includes input edge 902, opposing edge 904, first major surface 906 and second major surface 908. Second major surface 908 includes multiplets 915, 916 and 917. Light source 960 is disposed to inject light into input edge 902. Light guide 900 includes center plane 907. A light 970 from light source 960 has an angle $\theta_a$ in air relative to a plane parallel to center plane 907. After light 970 enters light guide 900, it has an angle $\theta_b$ in the medium of light guide 900 relative to a plane parallel to center plane 907.

Figure 9B:
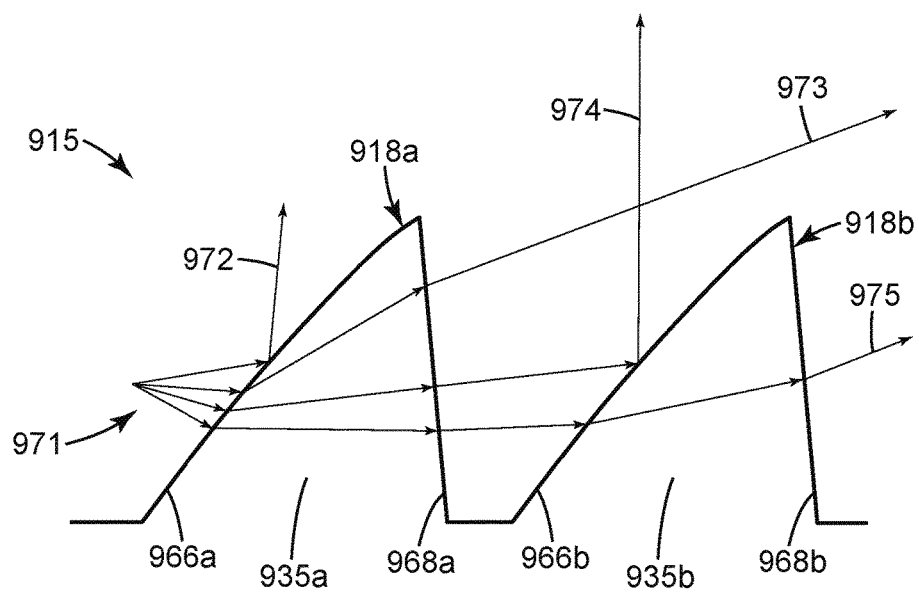
FIG. 9B is a schematic cross-section view of a light beam incident on a multiplet of the lighting panel of FIG. 9A.

FIG. 9B provides a magnified view of multiplet 915 which includes extraction features 918a and 918b. Extraction features 918a and 918b contain air pockets 935a and 935b, respectively. Extraction feature 918a includes first surface 966a and second surface 968a. Similarly, extraction feature 918b includes first surface 966b and second surface 968b. Light beam 971 is incident on multiplet 915. Light beam 971 includes light rays 972, 973, 974 and 975. Light ray 972 is incident on first surface 966a of extraction feature 918a at an angle of incidence relative to a normal to first surface 966a that is above the critical angle where TIR occurs. Light ray 972 reflects off of first surface 966a via TIR and exits light guide 900 in a direction that is close to normal to first major surface 906.

Light ray 973 is incident on first surface 966a at an incidence angle below the critical angle for TIR and light ray 973 is transmitted through surface 966a into air pocket 935a. It is then transmitted through second surface 968a back into light guide 900. Light ray 973 misses extraction feature 918b and is incident on first major surface 906 of light guide 900 at an incident angle above the critical angle for TIR. Light ray 973 is reflected from first major surface 906 and is subsequently extracted from the light guide when it is interacts with another multiplet (for example, multiplet 916 or 917) in light guide 900.

Light ray 974 is incident on first surface 966a at an incidence angle below the critical angle for TIR and light ray 974 is transmitted through first surface 966a into air pocket 935a. It is then transmitted through second surface 968a back into light guide 900 where it is incident of first surface 966b of second extraction feature 918b at an incidence angle above the critical angle for TIR. Light ray 974 reflects from first surface 966b and exits light guide 900 in a direction approximately normal to first major surface 906 of light guide 900.

Light ray 975 is incident on first surface 966a at an incidence angle below the critical angle for TIR and light ray 975 is transmitted through surface 966a into air pocket 935a. It is then transmitted through second surface 968a into light guide 900. Light ray 975 is then incident on first surface 966b of extraction feature 918b at an incidence angle below the critical angle for TIR. Light ray 975 is transmitted through first surface 966b into air pocket 935b. It is then incident on second surface 968b and re-enters light guide 900 where it is incident on first major surface 906 at an incident angle above the critical angle for TIR. Light ray 975 is reflected from first major surface 906 and is subsequently extracted from the light guide when it is interacts with another multiplet in light guide 900.

First surface 966a has a curved shape that curves away from the input edge. In some embodiments, first surface 966a may include one or more flat or curved portions.

The multiplet extractors can preserve or improve the collimation of the source light. In some embodiments, when the light exits the LCD panel it has a half-angle width at half-maximum power relative to at least one axis of the display of no more than about 35 degrees, or no more than about 30 degrees, or no more than about 25 degrees. In some embodiments, light from the light guide illuminates an LCD panel and when the light exits the LCD panel it has a half-angle width at half-maximum power relative to both axes of the display of no more than about 35 degrees, or no more than about 30 degrees, or no more than about 25 degrees.

As used herein, layers, components, or elements are described as being adjacent one another. Layers, components, or elements can be adjacent one another by being in direct contact, by being connected through one or more other components, or by being held next to one another or attached to one another. Layers, components, or elements that are in direct contact are described as being immediately adjacent.

Unless otherwise indicated, all numbers expressing feature sizes, amounts, and physical properties used in the specification and claims are to be understood as being modified in all instances by the term "about."

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

EXAMPLES

Example 1

A simulation of laminated display units was carried out using SolidWorks 2013, which is simulation software commercially available from SolidWorks Corp., Waltham Wash. In the simulation, a static 1 Newton force distributed over a circle with a diameter of 1 cm was applied to the center of a 19 cm×24.5 cm cover glass with other layers in the display having dimensions of 18 cm×23.5 cm and centered on the cover glass. The deflection at the 18 cm×23.5 cm boundary was set to zero and the maximum deflection at the center of the display was computed. The cover glass was taken to be 600 micron thick glass, the liquid crystal panel (LCP) was taken to be 400 micron thick glass, the backlight unit (BLU) was taken to be 500 micron thick PMMA, and the high modulus layer (HML) was taken to be 200 micron thick glass. Each glass layer was modeled using a Young's Modulus of 68.935 GPa and a Poisson ratio of 0.23. The backlight unit was considered to be PMMA with a Young's Modulus of 2.77 GPa and the Poisson ratio of PMMA was considered to have a negligible effect so it was set to zero in the simulation.

The resulting maximum deflection is given in the table below.

| Construction | Total Thickness (microns) | Deflection (microns) |
| --- | --- | --- |
| Cover glass + LCP | 1000 | 34.4 |
| Cover glass + LCP + BLU | 1500 | 31.0 |
| Cover glass + LCP + BLU + HML | 1700 | 10.7 |

The Cover glass+LCP simulation gives a deflection that is representative of conventional LCD display units since in such display units, the BLU is not laminated to the Cover glass+LCP and so would not produce the additional reduction in deflection reported for the Cover glass+LCP+BLU system. The addition of the HML in the laminated stack significantly reduces the deflection compared to the conventional LCD system. This shows that the laminated display units of the present description allow a display to be made that has a comparable thickness to conventional displays, but that has significantly improved stiffness.

Example 2

A simulation was performed as in Example 1, except that the cover glass was replaced by a 1 micron thick glass layer to model the effects of not including the cover glass. The resulting maximum deflection is given in the table below where the 1 micron thick cover glass is neglected.

| Construction | Total Thickness (microns) | Deflection (microns) |
|---|---|---|
| LCP | 400 | 475 |
| LCP + BLU | 900 | 230 |
| LCP + BLU + HML | 1100 | 29 |

This shows that the laminated display units of the present description allow displays to be made that are stiffer than conventional displays and that are significantly thinner and lighter (since less total glass thickness is used) than conventional displays.

Example 3

A simulation was performed as in Example 2, except that the high modulus layer was replaced with a 200 micron thick composite plate having a Young's modulus of 105 GPa, which is representative of alumina fiber/aluminum composites and continuous filament ceramic oxide fiber/aluminum composites.

| Construction | Total Thickness (microns) | Deflection (microns) |
|---|---|---|
| LCP + BLU + HML | 1100 | 22 |

This shows that the laminated display units of the present description allow displays to be made that are significantly stiffer than conventional displays and that are significantly thinner and lighter than conventional displays.

Descriptions for elements in figures should be understood to apply equally to corresponding elements in other figures, unless indicated otherwise. The present invention should not be considered limited to the particular embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. A laminated display unit comprising:
a light guide having a first major surface, a second major surface opposite the first major surface, an input edge, and an opposing edge, the light guide having a refractive index $n_g$;
a first material disposed immediately adjacent the first major surface of the light guide, the first material having a refractive index $n_1$;
a second material disposed immediately adjacent the second major surface of the light guide, the second material having a refractive index $n_2$;
an LCD panel laminated to the light guide adjacent the first major surface; and
a first high modulus layer laminated to the light guide adjacent the second major surface,
wherein $n_{max}$ is the larger of $n_1$ and $n_2$ and $n_g$ is greater than about 1.05 times $n_{max}$ and wherein at least one of the first major surface and the second major surface includes a plurality of multiplets, each multiplet including two or more extraction features.

2. The laminated display unit of claim 1, wherein $n_g$ is greater than about 1.1 times $n_{max}$.

3. The laminated display unit of claim 1, wherein $n_g$ is greater than about 1.2 times $n_{max}$.

4. The laminated display unit of claim 1, wherein $n_1$ is in a range of about 1.2 to about 1.5, $n_2$ is in a range of about 1.2 to about 1.5, and $n_g$ divided by $n_{max}$ is in a range of about 1.05 to about 1.4.

5. The laminated display unit of claim 1, wherein at least one of the first material and the second material is selected from the group consisting of a silicone adhesive, a nano-voided material, a sol-gel, an aerogel and a fluorinated material.

6. The laminated display unit of claim 1, further comprising one or more optical films between the LCD panel and the first material.

7. The laminated display unit of claim 6, wherein the one or more optical films includes a reflective polarizer and a first adhesive layer between the reflective polarizer and the LCD panel.

8. The laminated display unit of claim 1, further comprising one or more polymeric films between the second material and the high modulus layer.

9. The laminated display unit of claim 1, wherein the light guide includes extraction features disposed to redirect the light injected into the light guide through the LCD panel such that when the light exits the LCD panel it has a half-angle width at half-maximum power relative to at least one axis of the display of no more than about 30 degrees.

10. The laminated display unit of claim 1, wherein the extraction features are indented features containing air pockets.

11. The laminated display unit of claim 10, wherein a first extraction feature includes a central region having a first length and a tapered region having a second length smaller that the first length and a second feature includes a central region having a third length and a tapered region having a fourth length larger that the third length.

12. The laminated display unit of claim 1, wherein the plurality of multiplets include a spacing between adjacent multiplets that decreases from the input edge to the opposing edge.

13. The laminated display unit of claim 1, wherein a length of the extraction features increases from the input edge to the opposing edge.

14. The laminated display unit of claim 1, further comprising a second high modulus layer laminated to the LCD panel opposite the light guide.

15. The laminated display unit of claim 1, further comprising a hardcoat layer on the LCD panel opposite the light guide.

16. The laminated display unit of claim 1, wherein the laminated display unit has a total thickness less than about 1.3 mm and wherein the laminated display unit exhibits a deflection of less than 35 microns when subject to a 1 N load distributed over a circular area 1 cm in diameter in the center of a rectangular area of about 18 cm by 23.5 cm when the laminated display unit is supported at a boundary of the rectangular area.

17. A laminated display unit comprising:
a light guide having a first major surface, a second major surface opposite the first major surface, an input edge, and an opposing edge, the light guide having a refractive index $n_g$;
a first material disposed immediately adjacent the first major surface of the light guide, the first material having a refractive index $n_1$;

a second material disposed immediately adjacent the second major surface of the light guide, the second material having a refractive index $n_2$;

an LCD panel laminated to the light guide adjacent the first major surface;

a first high modulus layer laminated to the light guide adjacent the second major surface; and a light source disposed to inject light into the input edge of the light guide, wherein $n_{max}$ is the larger of $n_1$ and $n_2$ and the light injected into the light guide is at least partially collimated such that at least 90% of the light injected into the light guide has an angle relative to a plane substantially parallel to a center plane of the light guide that is no more than about the inverse cosine of $n_{max}/n_g$.

18. The laminated display unit of claim 17, wherein the light source includes:

a light emitting component that emits light having a first aspect ratio; and a converter unit that includes an anamorphic light guide to receive the light from the light emitting component, a diverter array to receive and divert light from the anamorphic light guide, and a concentrator to collect light received from the diverter array, wherein the concentrator outputs light having a second aspect ratio, the second aspect ratio being greater than the first aspect ratio, and wherein an effective height of the output light from the concentrator is lower than an effective height of the light emitted by the light emitting component.

19. The laminated display unit of claim 17, wherein at least one of the first major surface and the second major surface includes a plurality of multiplets, each multiplet including two or more indented extraction features containing air pockets.

20. A laminated display unit comprising:

a light guide having a first major surface, a second major surface opposite the first major surface, an input edge, and an opposing edge, the light guide having a refractive index $n_g$;

a first material disposed immediately adjacent the first major surface of the light guide, the first material having a refractive index $n_1$;

a second material disposed immediately adjacent the second major surface of the light guide, the second material having a refractive index $n_2$;

an LCD panel laminated to the light guide adjacent the first major surface;

a high modulus layer laminated to the LCD panel opposite the light guide, wherein the light guide comprises a transparent high modulus material and wherein $n_{max}$ is the larger of $n_1$ and $n_2$ and $n_g$ is greater than about 1.05 times $n_{max}$ and wherein at least one of the first major surface and the second major surface includes a plurality of multiplets, each multiplet including two or more extraction features.

* * * * *

UNITED STATES PATENT AND TRADEMARK OFFICE
CERTIFICATE OF CORRECTION

PATENT NO. : 9,599,766 B2
APPLICATION NO. : 14/254678
DATED : March 21, 2017
INVENTOR(S) : Andrew Ouderkirk Page 1 of 1

It is certified that error appears in the above-identified patent and that said Letters Patent is hereby corrected as shown below:

Column 10
Line 54, after "of" insert -- III-V --.

Column 18
Line 36 (approx.), in Claim 11, delete "that" and insert -- than --, therefor.
Line 38 (approx.), in Claim 11, delete "that" and insert -- than --, therefor.

Signed and Sealed this
Ninth Day of January, 2018

Joseph Matal
*Performing the Functions and Duties of the*
*Under Secretary of Commerce for Intellectual Property and*
*Director of the United States Patent and Trademark Office*